United States Patent [19]

Ekstrom et al.

[11] 4,126,892
[45] Nov. 21, 1978

[54] SELECTIVE VOLTAGE AND CURRENT CONTROL FOR HIGH VOLTAGE D.C. TRANSMISSION SYSTEMS

[75] Inventors: Ake Ekstrom; Kjell Eriksson; Lars-Erik Juhlin, all of Ludvika, Sweden

[73] Assignee: Asea AB, Vasteras, Sweden

[21] Appl. No.: 766,004

[22] Filed: Feb. 7, 1977

Related U.S. Application Data

[63] Continuation of Ser. No. 606,593, Aug. 21, 1975, abandoned.

[30] Foreign Application Priority Data

Sep. 11, 1974 [SE] Sweden .......................... 7411456

[51] Int. Cl.² .......................................... H02M 5/45
[52] U.S. Cl. .................................... 363/35; 363/51
[58] Field of Search .................... 322/25; 363/35, 51, 363/79, 81

[56] References Cited

U.S. PATENT DOCUMENTS

| | | | |
|---|---|---|---|
| 3,242,417 | 3/1966 | Bertschi | 322/25 |
| 3,543,129 | 11/1970 | Boksjö | 363/35 |
| 3,614,585 | 10/1971 | Wedin | 363/35 |
| 3,805,144 | 4/1974 | McSparran | 322/25 |

Primary Examiner—William M. Shoop
Attorney, Agent, or Firm—Watson, Cole, Grindle & Watson

[57] ABSTRACT

A high voltage direct current transmission includes a rectifier station and an inverter station connected by a DC line. The rectifier station has uncontrolled valves and an arrangement enabling current control to be effective at over-current conditions for controlling the alternating voltage connected to the valves. There are first and second control circuits, the first of which is controlled in dependence on the line voltage and the second in dependence on the line current. A circuit for selecting either the first or the second control circuit is provided between the control circuits and the voltage control arrangement. The valves of the rectifier station may be arranged in two six-pulse groups mutually offset in phase, so reactively connected that they have the commutating reactance partly in common.

5 Claims, 5 Drawing Figures

SELECTIVE VOLTAGE AND CURRENT CONTROL FOR HIGH VOLTAGE D.C. TRANSMISSION SYSTEMS

This is a continuation of application Ser. No. 606,593 filed Aug. 21, 1975, and now abandoned.

BACKGROUND OF THE INVENTION

1. Field of the Invention

The invention relates to a high voltage direct current transmission system comprising a rectifier station and an inverter station connected by a DC line, which rectifier station includes uncontrolled valves and means for controlling the alternating voltage connected to the valves.

2. The Prior Art

In direct current transmissions where the rectifier side is constructed with uncontrolled valves, the direct current is controlled by the inverter station during normal operation, and therefore the transmission must be secured against overcurrents if the inverter voltage breaks down or in the case of a short-circuit on the line.

SUMMARY OF THE INVENTION

According to the invention it is therefore proposed to provide the rectifier station with combined voltage and current controls on the AC side and a dominance connection between these two controls, so that the greatest control magnitude constantly dominates the control of the alternating voltage. Such a control is able to ensure against overcurrents primarily because the inductance in smoothing reactors and other inductances are so high that the voltage control of the rectifier has time to maintain the voltage and thus the current at reasonable values. If, in this connection, the reference value of the voltage control is constituted by the alternating voltage of the inverter station after deduction of a reasonable voltage margin, a reasonable starting value of the rectifier voltage can be secured in case of disturbances.

The inventive concept is most suitable for a rectifier station fed directly from a generator of its own, in which case the relatively quick voltage control of the generator can be utilized for the purpose of the invention.

The current-limiting effect of the inductances of the plant can be strengthened in a rectifier station having valves in two six-pulse groups, mutually offset in phase to a twelve-pulse connection, by connecting these together so that they have a partly common commutating reactance, for in this way the voltage of the rectifier will drop strongly in case of overcurrents because of an overlap between the commutations.

BRIEF DESCRIPTION OF THE DRAWINGS

In other respects the invention will be described in more detail with reference to the accompanying drawing, in which FIG. 1 shows a DC transmission according to the invention whereas

DESCRIPTION OF THE PREFERRED EMBODIMENTS

Figure 1:
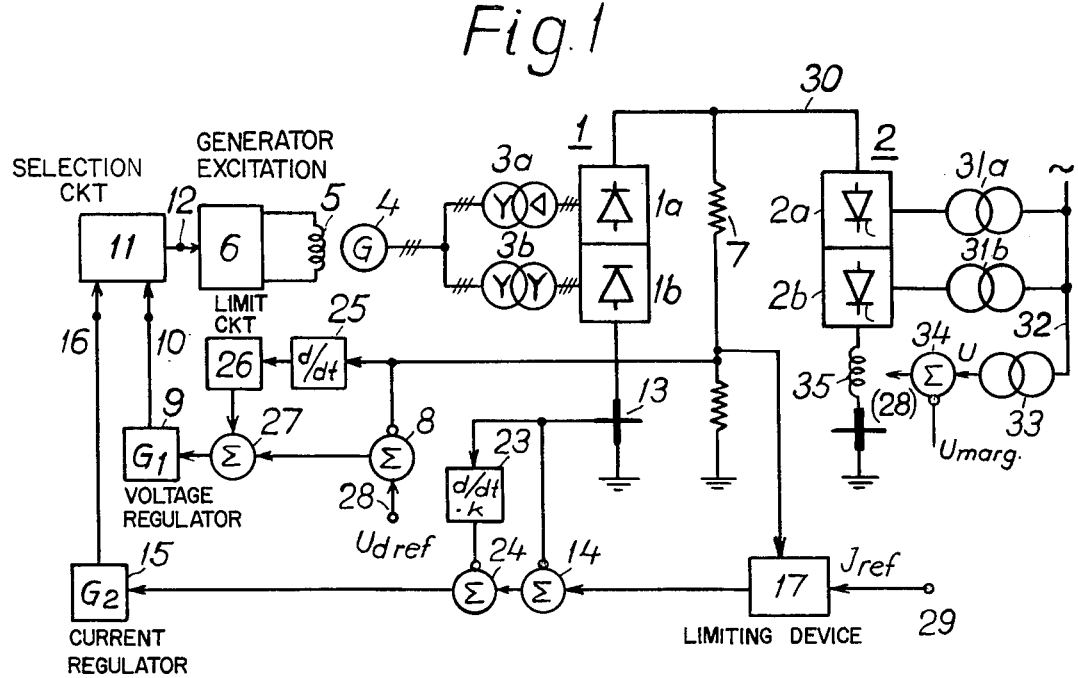

FIG. 1 shows a DC transmission comprising a rectifier station 1 and an inverter station 2 connected together by way of a DC line 30.

The rectifier station comprises two series-connected diode bridges 1a and 1b, each having a static convertor transformer 3a and 3b, respectively, fed from a generator 4 with a field winding 5 connected to the feeder 6. For the feeder 6 and thus the generator voltage there are two control circuits, namely a voltage control circuit from voltage divider 7 to the output 10 of voltage regulator 9 and a current control circuit from current measurement device 13 to the output 16 of current regulator 15.

The voltage circuit comprises a voltage divider 7 connected to the line 30 and the voltage from this divider is compared with a reference value $U_{dref}$ connected to the terminal 28 on the summator 8. The difference is passed to the voltage regulator 9. The current circuit comprises a current measurement deivce 13, the output value of which is compared in the summator 14 with a reference value $I_{ref}$, for example transmitted from the inverter station and connected to the terminal 29. The difference signal is passed to the current regulator 15. With the help of the limiting device 17, connected to voltage divider 7, the current reference can be made voltage-dependent so that the current reference at least partly follows the line voltage.

In order to make the two circuits faster and more sensitive, they are suitably provided with derivation circuits. The derivation circuit 23 for the current circuit is connected by way of the summator 24 with the same polarity as the current signal from 13 so that a positive current derivative gives a decreased signal to current regulator 15, that is a signal which indicates an increased voltage reduction of the feeder 6 and thus of the generator voltage.

The derivation circuit 25 for the voltage circuit is connected by way of a limiting circuit 26 and the summator 27 with a polarity opposite to the polarity of the signal from voltage divider 7. The circuit 26 also limits the signal to negative values so that only negative derivatives of a certain magnitude are passed through. Such negative derivatives indicate rapid voltage reductions on the line, which in turn are probably due to disturbances, for example in the form of a line fault or a breakdown in the inverter station.

The regulators 9 and 15 are connected to the input terminals 10 and 16, respectively, of the selection circuit 11, and the signal of lowest potential is passed through the output 12 to the feeder 6 for controlling the generator voltage. During normal operation, when the current control of the inverter secures the desired direct current, equal to or less than $I_{ref}$, the signal from current regulator 15 becomes zero or positive, and therefore the previously described voltage control circuit will dominate the control. In case of faults on the line or the inverter, which causes the direct current to increase, the previously described current control circuit will dominate and reduce the generator voltage at a certain time. This effect can be strengthened by means of the circuit 17 which reduces the current reference at a low line voltage, thus amplifying the signal to reduce the voltage of the generator.

The inverter station 2 comprises two controlled rectifier bridges 2a and 2b with convertor transformers 31a and 31b connected to an AC network 32. In order to recognize quickly voltage reductions in the network 32 before these reductions are able to cause considerable overcurrents on the DC line, the voltage reference $U_{ref}$ in the rectifier station is suitably derived from the network 32 by way of the voltage transformer 33 and the summator 34, where the voltage value is reduced with the required voltage margin. From there the reference value is transmitted to the terminal 28 in the rectifier station by some telecommunications line. In this way the desired voltage margin between the stations is secured in case of variations in the line voltage.

In FIG. 1 the rectifier station is fed directly from the generator 4, the voltage control of which can therefore be utilized for controlling the line voltage. If the rectifier station is connected to a larger network with a voltage control dictated from outside, the rectifier station can instead be controlled by way of tap changers on the transformers 3a and 3b or on the main transformer for the whole station. In that case the selection circuit 11 is connected to the relevant tap changer.

Figure 2:
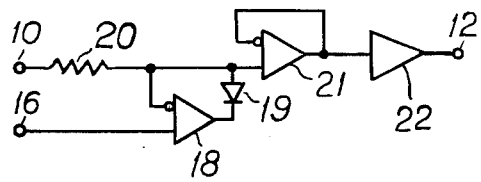
FIG. 2 shows a part of the rectifier station.

FIG. 2 shows an example of how the selection circuit 11 can be designed. The figure shows input terminals 10, 16 and the output terminal 12. For each circuit there is an amplifier 21 and 18, respectively, and for the voltage circuit there is an input resistor 20. The amplifier 18 of the current circuit is connected, by way of the diode 19, to the input of the amplifier 21 of the voltage circuit. In this way normal control, that is control of a moderate magnitude, as well as all voltage increasing control will take place over the voltage circuit 10, 21. Only reduction signals from the current circuit 16, 18 of a certain magnitude, that is emanating from disturbances in the transmission, will dominate over the voltage circuit and pass through to the output 12. An additional control amplifier 22 may be inserted on the output from 11.

In FIG. 1 the diode bridges 1a and 1b, which are suitably six-pulse bridges, are provided with convertor transformers 3a and 3b in a Y/D and a Y/Y connection respectively. This will cause the two rectifiers to form together a 12-pulse group. Because the generator 4 is connected directly to the transformers 3a and 3b, the generator reactance will be included in the commutating reactances of the rectifiers, which means that the rectifier station will have a steeply falling voltage characteristic upon an increasing current because of the overlap of the commutating intervals during 12-pulse operation. Such overlapping occurs in the case of six-pulse operation only at far higher currents, and therefore the voltage would drop much more slowly upon an increasing current if the two rectifiers 1a, 3a and 1b, 3b were not connected together by way of the generator 4.

Figure 3:
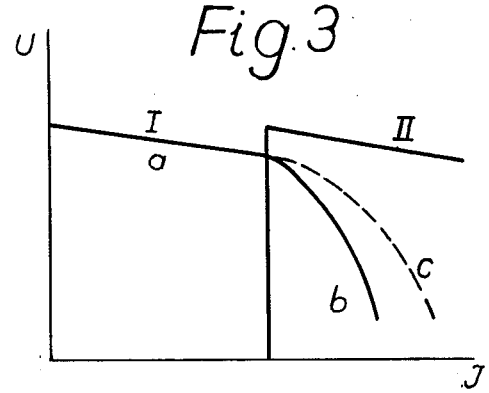
FIG. 3 shows current-voltage characteristics for the stations.

The above-mentioned situation has been illustrated in FIG. 3, which shows current-voltage characteristics I and II for the rectifier side and inverter side, respectively. The rectifier characteristic has first a straight, slightly sloping part 1, which at higher currents changes to a rapidly falling part because of the overlap between th commutations. In 12-pulse operation this happens considerably earlier, according to the curve b, than in six-pulse operation which follows curve c. Therefore, because of the common commutating reactance during 12-pulse operation, an automatic voltage reduction of the rectifier station is obtained, and this voltage reduction may be so strong that a particular smoothing reactor for limiting the direct current may be dispensed with, so that it is only necessary to have a smoothing reactor 35 in the inverter station for smoothing the direct current ripple.

Figure 4A:
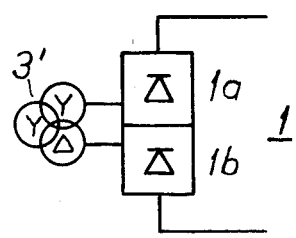
FIGS. 4a and 4b show various ways of connecting together the two valve bridges of the rectifier station.
Figure 4B:
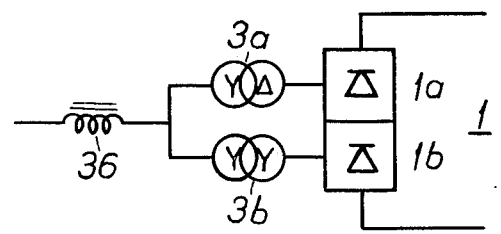

If the rectifier station has no generator of its own, the connection of the two rectifiers can be made according to FIG. 4a or 4b, that is either by way of a common transformer 3′ having two valve windings (FIG. 4a), or by way of an AC reactor 36 (FIG. 4b).

We claim:
1. High voltage direct current transmission system comprising a rectifier station and an inverter station connected together by a DC line, the rectifier station comprising uncontrolled valves and means for controlling the alternating voltage connected to the valves, said means for controlling comprising first and second control circuits for controlling said alternating voltage, said first control circuit being controlled in dependence on the DC line voltage, and said second control circuit being controlled in dependence on the DC line current, said second control circuit being responsive to a predetermined current reference value and further including means for adjusting said current reference value in accordance with said DC line voltage so that said current reference valve is reduced with decreasing line voltage, and a circuit for selecting said first control circuit during normal operation of said rectifier station and said inverter station and for selecting said second control circuit upon detection of an over-current condition in said rectifier station.

2. A high voltage direct current transmission system wherein a rectifier station and an inverter station are interconnected by a DC line, said rectifier station comprising:
a plurality of uncontrolled valves and means for controlling the alternating voltage connected to said uncontrolled valves, said uncontrolled valves being interconnected in two six-pulse groups mutually offset in phase to a 12-pulse connection;
first and second control circuits for controlling said alternating voltage;
said first control circuit being controlled in dependence on said DC line voltage;
said second control circuit being controlled in dependence on said DC line current; and
a circuit for selecting said first circuit during normal operation of said rectifier station and said inverter station, and for selecting said second control circuit upon detection of an over-current condition in said rectifier station, and whereby the commutating reactance of said 12-pulse connection is uncompensated such that said commutating reactance provides an additional means for controlling said alternating voltage.

3. A high voltage direct current transmission system as in claim 2 whereby said means for controlling the alternating voltage includes a generator directly connected to said twelve-pulse connection whereby the reactance of said generator forms part of said commutating reactance.

4. A high voltage direct current transmission system as in claim 2 wherein said means for controlling the alternating voltage includes a common transformer having a plurality of windings equal to said plurality of uncontrolled valves, the leakage reactance of said common transformer forming part of said commutating reactance.

5. A high voltage direct current transmission system as in claim 2 wherein said means for controlling the alternating voltage includes an AC reactor, the reactance of said AC reactor forming part of said commutating reactance.

* * * * *